United States Patent [19]

Schafer

[11] Patent Number: 5,105,771
[45] Date of Patent: Apr. 21, 1992

[54] ANIMAL DRINKER

[76] Inventor: Kenneth L. Schafer, Rte. 3, Box 73, LeSueur, Minn. 56058

[21] Appl. No.: 675,133

[22] Filed: Mar. 26, 1991

Related U.S. Application Data

[63] Continuation-in-part of Ser. No. 597,926, Oct. 15, 1990, abandoned.

[51] Int. Cl.$^5$ ................................................ A01K 7/02
[52] U.S. Cl. .......................................... 119/73; 119/74
[58] Field of Search .................................. 119/73, 74

[56] References Cited

U.S. PATENT DOCUMENTS

| | | |
|---|---|---|
| 232,077 | 9/1880 | Shaw et al. |
| 669,415 | 3/1901 | Jacobs . |
| 1,086,785 | 2/1921 | Parkins . |
| 1,684,197 | 9/1928 | Petsch . |
| 1,835,352 | 12/1931 | Stangl . |
| 2,629,040 | 2/1953 | Smith ................................ 119/73 |
| 3,745,977 | 7/1973 | Martin . |
| 3,835,882 | 9/1974 | Barker et al. . |
| 4,003,340 | 1/1977 | Kuzara et al. . |
| 4,110,885 | 7/1978 | Kapplinger . |
| 4,343,264 | 8/1982 | Schafer et al. .................... 119/73 |
| 4,395,974 | 8/1983 | Schafer et al. .................... 119/73 |
| 4,559,905 | 12/1985 | Ahrens ............................. 119/73 |
| 4,708,091 | 11/1987 | Schafer ............................. 119/73 |
| 4,744,332 | 5/1988 | Ahrens ............................. 119/73 |
| 4,785,767 | 11/1988 | Ryder . |
| 4,962,730 | 10/1990 | Schafer ............................. 119/73 |

OTHER PUBLICATIONS

Fibernetics Brochure—Cattle Drinkers.

Primary Examiner—Paul J. Hirsch
Attorney, Agent, or Firm—Burd, Bartz & Gutenkauf

[57] ABSTRACT

An animal watering drinker has a tank having walls surrounding a chamber for holding water. A top unit mounted on the tank has drinking openings and a continuous first baffle extended downward below the normal level of water in the chamber. The top unit has a top opening open to the space surrounded by the first baffle. A cap mounted on the top unit closes the top opening therein. The cap has a second baffle extended downwardly below the normal level of water in the chamber surrounding a float valve assembly operable to supply water to the chamber. In one form of the drinker, the cap has a plug that closes the top opening in the top unit. Doors pivotally mounted on the top unit normally close the drinking openings.

38 Claims, 8 Drawing Sheets

ANIMAL DRINKER

CROSS REFERENCE TO RELATED APPLICATION

This application is a continuation-in-part of U.S. patent application Ser. No. 597,926 filed Oct. 15, 1990 now abandoned.

FIELD OF INVENTION

The invention pertains to water drinkers for providing an outdoor source of drinking water for animals. The water drinkers have insulated tanks and tops with movable doors closing drinking wells to prevent freezing of water within the tanks in cold environmental conditions.

BACKGROUND OF INVENTION

Stock drinkers have been constructed with tanks insulated with foam or other insulated materials for keeping the water from freezing during the winter months and cool during the summer months. Examples of animal drinkers having foam plastic insulated walls are shown in U.S. Pat. Nos. 3,745,977 which issued to M. W. Martin on July 17, 1973, 4,100,885 which issued to L. E. Kapplinger on July 18, 1978, 4,343,264 which issued to K. L. Schafer and M. L. Peterson on Aug. 10, 1982, and 4,395,974 which issued to K. L. Schafer and M. L. Peterson on Aug. 2, 1983. These animal drinkers have inner and outer plastic walls reinforced with glass fibers. The walls are separately made and secured together. Foam plastic is then injected into the space between the inner and outer walls. This manufacturing procedure is labor intensive and expensive.

Tank-type watering devices have drinking wells closed with movable covers or doors. The animal raises a door to provide access to the water in the drinking well. Float valve assemblies are used to automatically maintain the level of the water in the tank. The float valve assemblies are isolated from the drinking wells with baffles that extend downwardly from the inside of the top wall of the watering devices into the water therein. The baffles extend transversely between the side walls of the tank. The baffles act as guides for directing convection circulation of water in the tank.

SUMMARY OF INVENTION

The invention is directed to an animal watering apparatus or drinker for animals such as hogs, cattle, sheep, horses and the like. The drinker has a tank having heat insulated walls of plastic foam insulation sandwiched between seamless plastic shells made by a rotational molding process. The tank has side walls and end walls having inwardly directed side and end shoulders in the upper portions thereof. A top unit having heat insulated walls of foam plastic insulation sandwiched between seamless plastic shells closes the top of the chamber of the tank. The tank and top units are made by a rotational mold process. The top unit has a downwardly directed continuous generally rectangular baffle extended into the chamber and spaced inwardly from the upright walls of the tank and above the bottom wall so that water is located between the baffle and the upright wall means of the tank. The baffle has transverse ends that are also back walls of the drinking wells of the drinker. The top unit has an opening surrounded by the baffle providing access to the chamber surrounded by the baffle. The baffle has a bottom edge located below the normal level of the water in the chamber. The normal level of the water in the chamber is above the side and end wall shoulders to block the flow of air into the chamber. A float valve assembly is located within the chamber surrounded by the baffle to supply water to the chamber. A cap mounted on the top wall closes the opening therein to prevent outside air from flowing into the chamber containing the float valve assembly to prevent freezing of the float valve assembly.

In one form of the drinker, the cap has a downwardly directed generally rectangular second baffle that closes the top opening in the top unit. Fasteners secure cap to top unit. The second baffle telescopes into the first baffle and surrounds the float valve assembly. The second baffle has a bottom edge located below the normal level of the water in the chamber surrounded by the first baffle to further isolate the float valve assembly from the outside environment. The cap can be removed from the top unit to allow servicing and replacement of the float valve asembly and cleaning of the inside of the tank.

In another form of the drinker, the cap has a plug that telescopes into the top of the chamber surrounded by the first baffle to close the opening in the top unit. The plug has side walls that are located close to the inside walls of the first baffle to block the flow of outside air into the chamber accommodating the float valve assembly. The cap has a vent passage to allow air to flow out of the chamber accommodating the float valve assembly.

The float valve assembly is connected to a water supply pipe extended upwardly through a tube connected to the bottom wall of the tank. The float valve assembly operates to maintain a selected level of water in the chamber and drinking wells located between the baffle and end walls of the tank. Doors pivotally mounted on the top unit normally close the top of the drinking wells. An animal moves a door to an open position to provide access to the water in the drinking well. The door will return to its closed position when the animal moves away from the drinking well. The insulation of the tank and top unit and the normal circulation of the water within the chamber and drinking well prevents the freezing of the water in the cold weather environments without the use of an outside energy, such as electric heaters.

In one form of the drinker, the tank has pockets at the bottom of the drinking wells for accommodating cool water. The pockets are on opposite sides of a central shelf and are surrounded by downwardly and inwardly lower side wall portions to aid the circulation of warm water from the chamber accommodating the float valve assembly into the drinking wells and cool water from the drinking wells into the central area of the tank chamber. This circulation increases the temperature of the water in the drinking wells thereby reducing the freezing of the water in the drinking wells in very cold weather environments.

DESCRIPTION OF PREFERRED EMBODIMENT

Figure 1:
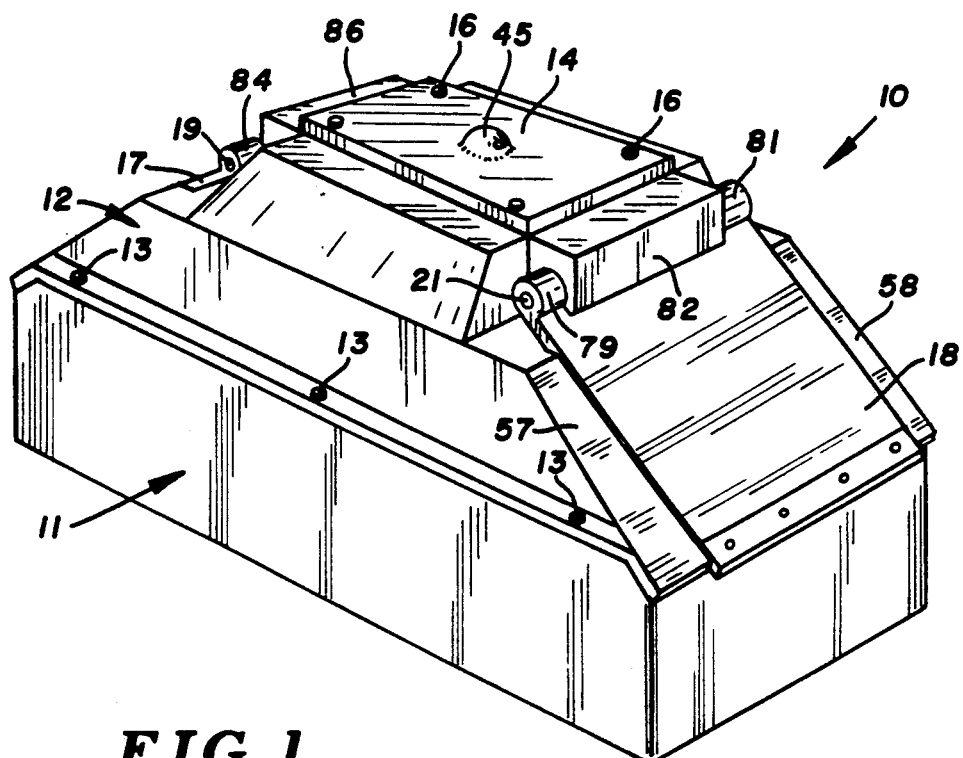
FIG. 1 is a perspective view of the animal drinker of the invention.
Figure 2:
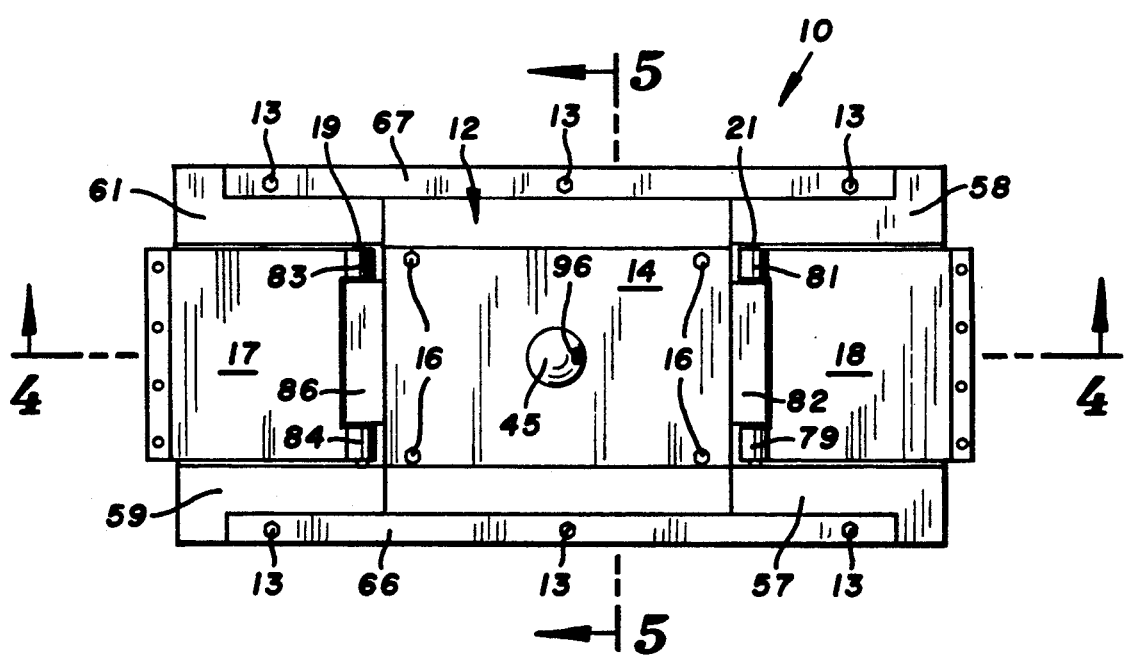
FIG. 2 is a top plan view thereof.
Figure 3:
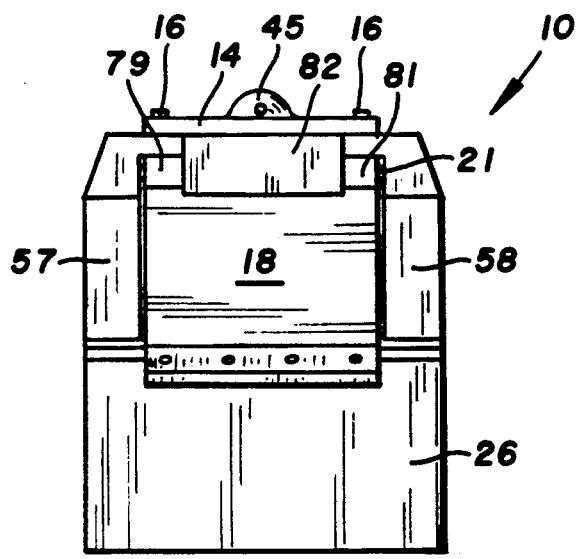
FIG. 3 is an end elevational view thereof of the right end of the animal drinker shown in FIG. 1.
Figure 4:
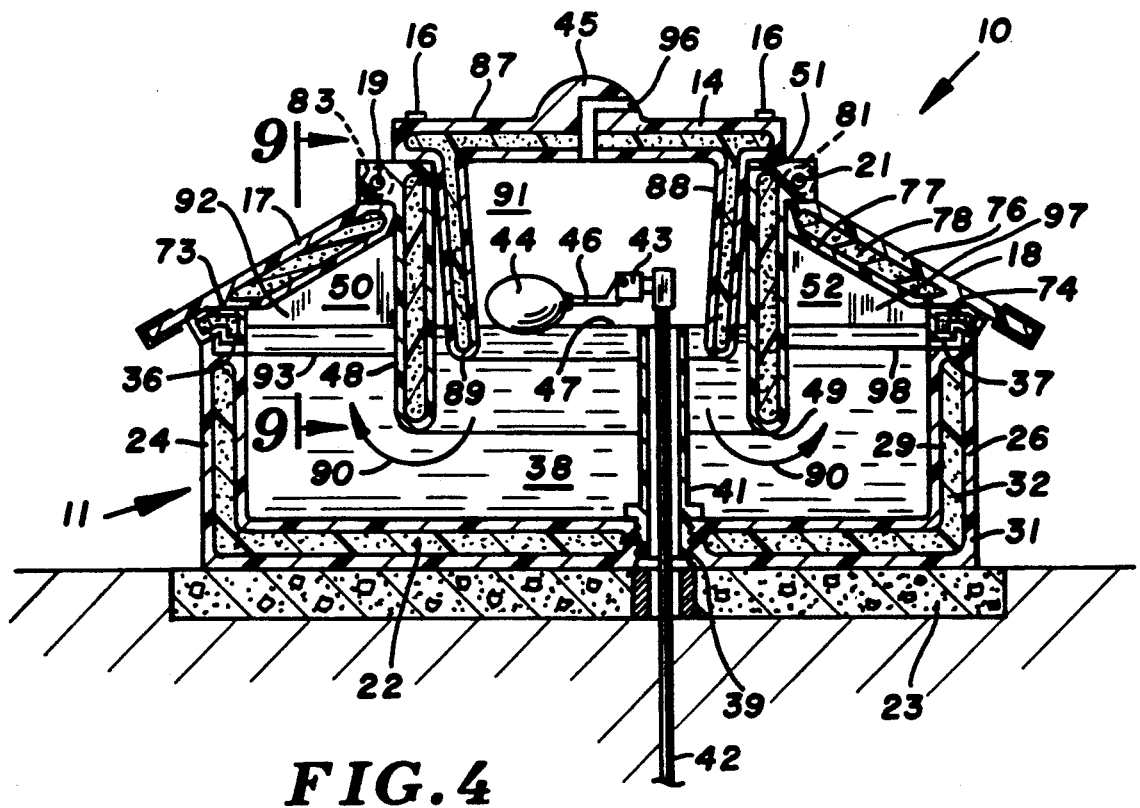
FIG. 4 is a sectional view taken along line 4—4 of FIG. 2.

Referring to FIGS. 1 to 3, there is shown an animal drinker of the invention indicated generally at 10 for providing animals, such as beef cattle, hogs, sheep, horses and the like with drinking water under cold climatic conditions without heaters for preventing freezing of the water in the drinker. Drinker 10 has a generally rectangular open top tank 11 supporting a top unit 12. A plurality of fasteners 13, such as bolts, screws and the like, secure top unit 12 to tank 11. A cap 14 is removable mounted on top unit 12 and retained thereon with a plurality of fasteners 16, such as bolts, screws and the like. Top unit 12 pivotally supports a pair of doors or lids 17 and 18 which close the tops of drinking openings or wells 50 and 52, as seen in FIG. 4, to prevent cold air from freezing the water in the drinking wells and preventing outside foreign materials from contaminating the water in the drinker. In warm climates doors 17 and 18 insulate the water in the wells 50 and 52 from outside heat thereby keeping the water cool. Transverse rods 19 and 21 pivotally support doors 17 and 18 on top unit 12 for movement about generally horizontal axes which allow doors 17 and 18 to be moved upwardly by an animal to provide access to the water in drinking wells 50 and 52.

Figure 5:
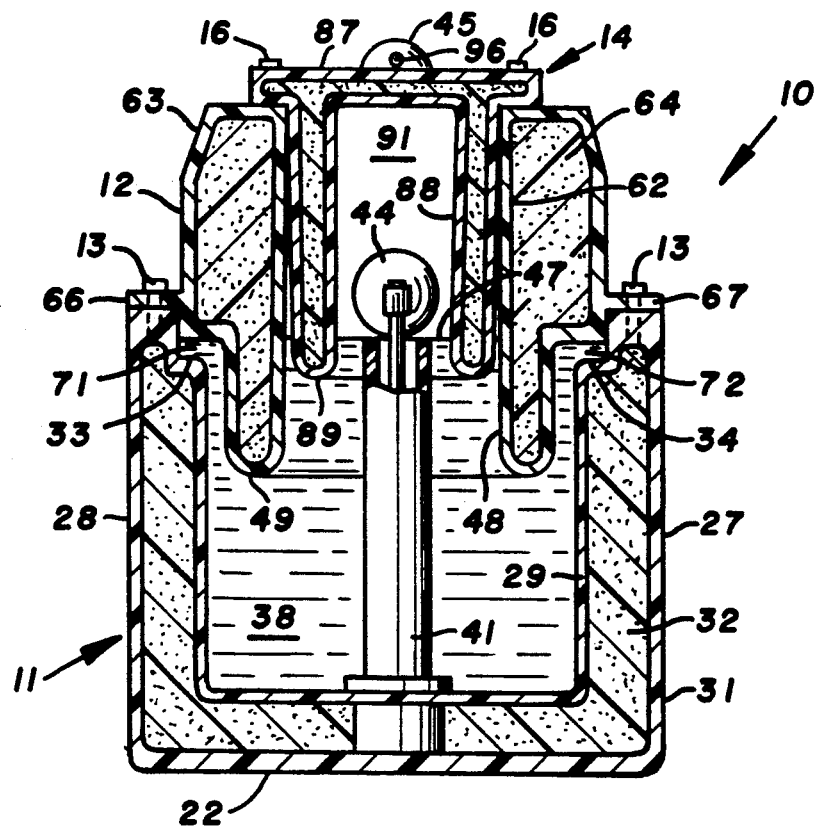
FIG. 5 is an enlarged sectional view taken along the line 5—5 of FIG. 2.
Figure 6:
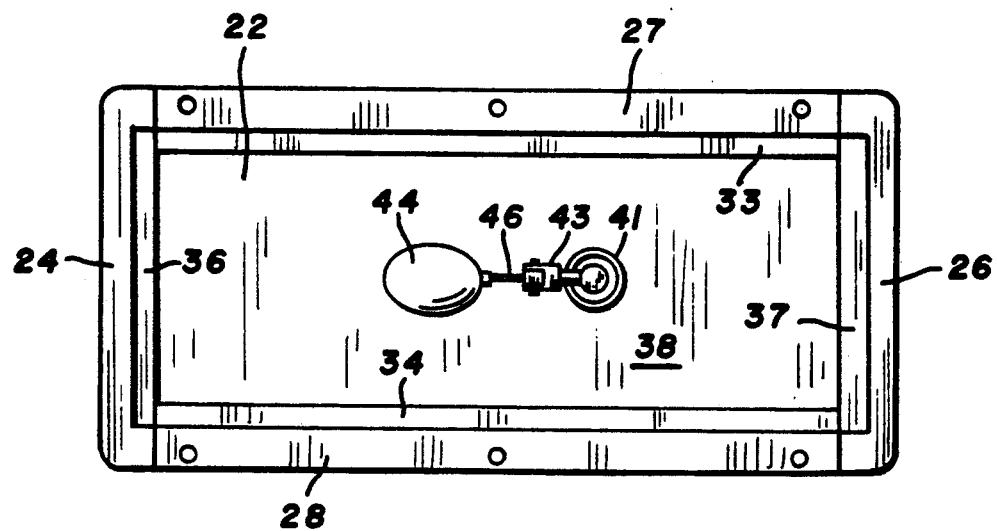
FIG. 6 is a top plan view of the tank of the animal drinker shown in FIG. 1.

As shown in FIGS. 4 and 5, tank 11 has a generally flat bottom wall 22 supported on a concrete slab 23 or other suitable support surface on the ground. Upright end walls 24 and 26 are joined to the opposite ends of bottom wall 22 and to upright side walls 27 and 28 to form a chamber 38 for accommodating water. Tank 11 is a one piece structure having an inner plastic shell 29 and an outer plastic shell 31 of polyethyene or like plastic material. A core 32 of foam plastic thermal insulating material, such as urethane foam or the like, is located between the inner and outer shells 29 and 31 to provide insulation for tank 11. Tank 11 may be made by a rotational molding process which forms the tank as a one piece plastic structure. The core of foam material is subsequently placed between the tank walls or shells 29 and 31. Other methods can be used to make tank 11.

As seen in FIG. 5, the inside upper edges of side walls 27 and 28 have longitudinal shoulders 33 and 34 which extend between transverse shoulders 36 and 37 in end walls 24 and 26 respectively. Returning to FIG. 4, bottom wall 22 has a threaded hole 29 accommodating an upright pipe 41 open to a hole in concrete slab 23 and open at the top end thereof to the upper portion of chamber 38. A water supply pipe 42 connected to an underground water main or pipe (not shown) extends through drain pipe 41 and is connected at its upper end to an on/off float valve assembly 43. Valve assembly 43 operates in response to level 47 of the water in chamber 38 with a float 44 and an arm 46 connecting the float to valve 43. When level 47 of the water in chamber 38 moves down float 44 moves down thereby opening the valve to discharge water into chamber 38. Float valve assembly 43 can be any of the usual float valves used in tanks to control the level of water in the tanks. Examples of float valves are shown by Barker et al in U.S. Pat. No. 3,835,882 and Schafer et al in U.S. Pat. No. 4,395,974.

Figure 7:
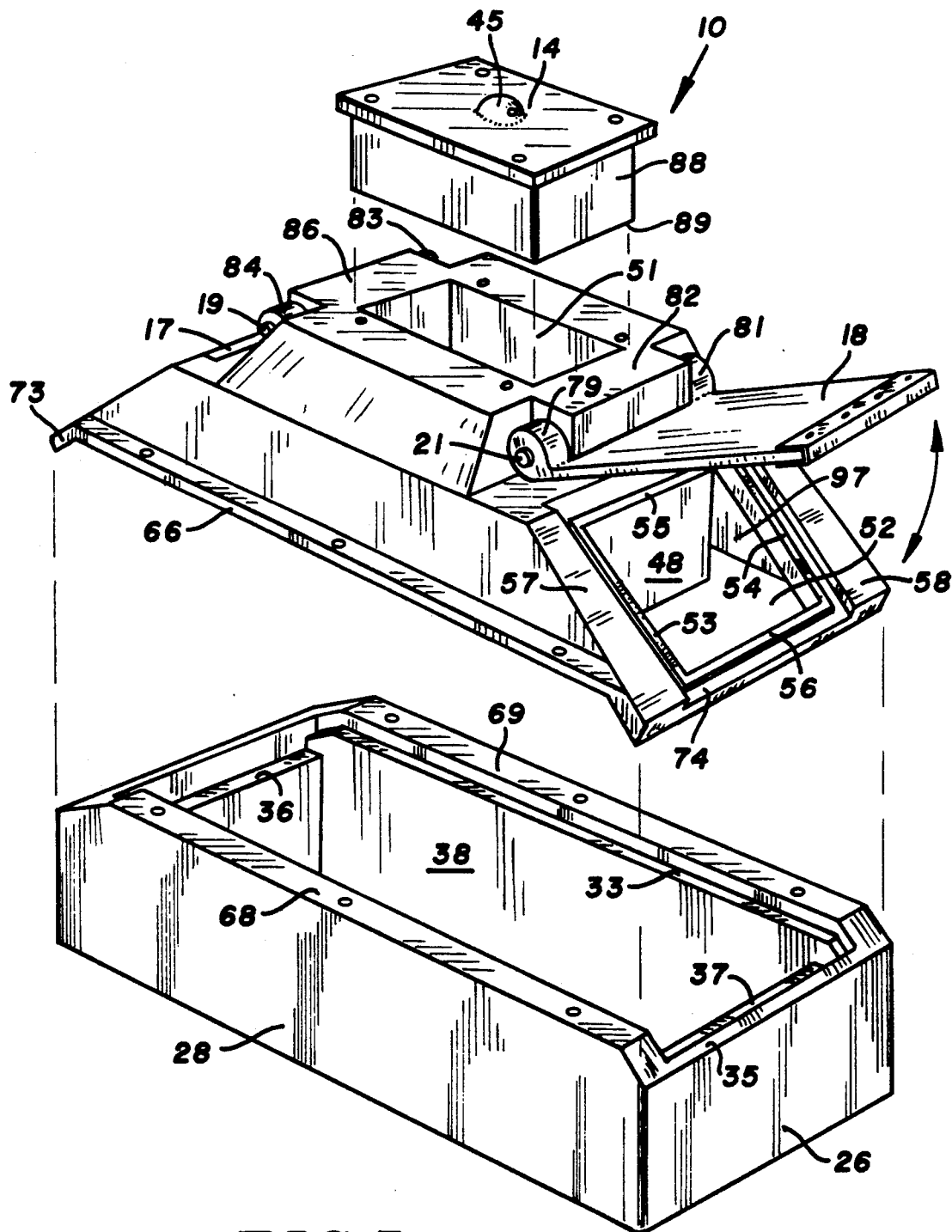
FIG. 7 is an exploded perspective view of the animal drinker of FIG. 1.

Top unit 12 has a generally rectangular downwardly directed generally rectangular baffle 48 surrounding the valve 43 and float 44 as well as the upper end of drain pipe 41. Baffle 48 has a continuous lower edge 49 that extends down into the water in tank chamber 38 to prevent the cold air from freezing the water within space 91 surrounded by baffle 48 which can cause valve 43 to malfunction. Top unit 12 has a top opening 51, as seen in FIG. 4 and 7, providing access to valve 43 and float 44 as well as drain pipe 41. Opening 51 is closed with cap 14. Cap 14 has an upwardly extended projection 45 accommodating a vent passage 96 to allow air to be vented from chamber 91 to atmosphere during filling of chamber 38 with water.

As shown in FIG. 7, a generally rectangular rib surrounds the outer periphery of drinking well 42. The rib comprises side ribs 53 and 54 joined to top and bottom ribs 55 and 56. Ribs 53-56 project upwardly from the top wall and form stops for the closed door 18. Door 18 is located between downwardly projected shoulders 57 and 58 which protect opposite sides of door 18 when it is in the closed position. As shown in FIGS. 1 and 4, door 18 projects outwardly from the end of top unit 12 providing a ledge or lip that can be engaged by the animal to open door 18. Top unit 12 has a generally rectangular rib, (not shown) surrounding drinking well 50 that is engaged by door 17 when it is in the closed position.

Figure 8:
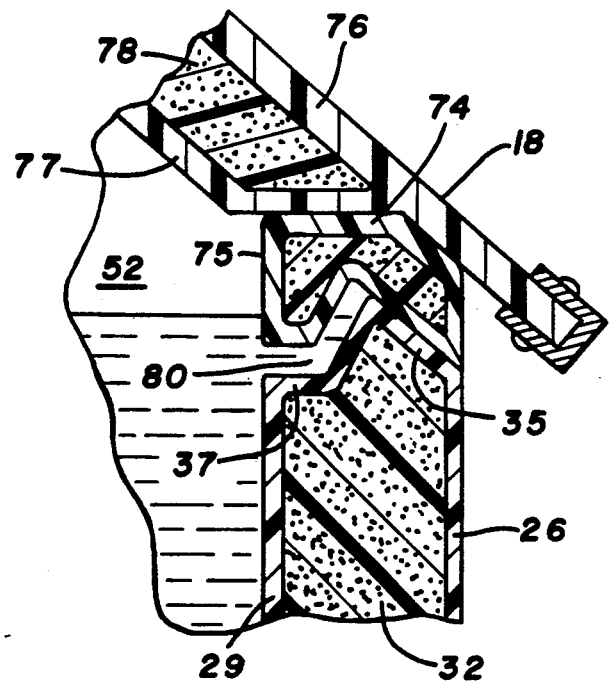
FIG. 8 is an enlarged sectional view taken along line 8—8 of FIG. 2.

As seen in FIG. 5, top unit 12 has an inner shell or wall 62 and an outer shell or wall 63 of polyethyene or like plastic material. A core of foam plastic, such as urethane and the like, is located between the inner and outer walls to insulate top unit 12. The opposite sides of top unit 12 have outwardly directed longitudinal flanges 66 and 67 that rest on top longitudinal ledges 68 and 69 of side walls 27 and 28. Flanges 66 and 67 are in surface engagement with top ledges 68 and 69 of tank 11 and are retained thereon by fasteners 13. Longitudinal spaces 71 and 72 between shoulders 33 and 34 and top unit 12 accommodate water in tank chamber 38 to prevent air from entering the top of chamber 38. As seen in FIG. 8, end wall 74 of top unit 12 rests on an upwardly directed transverse rib 35 located outwardly from shoulder 37. End wall has a downwardly directed transverse rib 75 spaced from shoulder 37 providing a channel 80 for water. End wall 73 has the same structure as end wall 74. The water in spaces 71, 72 and channel 80 functions as a seal to prevent outside air from flowing into chamber 38. Seal structures are not required between the top of tank 11 and top unit 12 to block the flow of outside air into tank chamber 38. Baffle 48 is spaced from the inside of side walls 28 and 29 of tank 11 so that water can circulate around baffle 48 and in spaces 71 and 72. The water in spaces 71 and 72 function as a seal to minimize the flow of cold air into chamber 38. In extreme cold weather conditions the water in spaces 71 and 72 may freeze thereby blocking the flow of cold air into chamber 38. As shown in FIG. 7, top unit 12 has transverse downwardly directed end members 73 and 74 that rest on the transverse end ribs 75 when top unit 12 is attached to tank 11.

Figure 9:
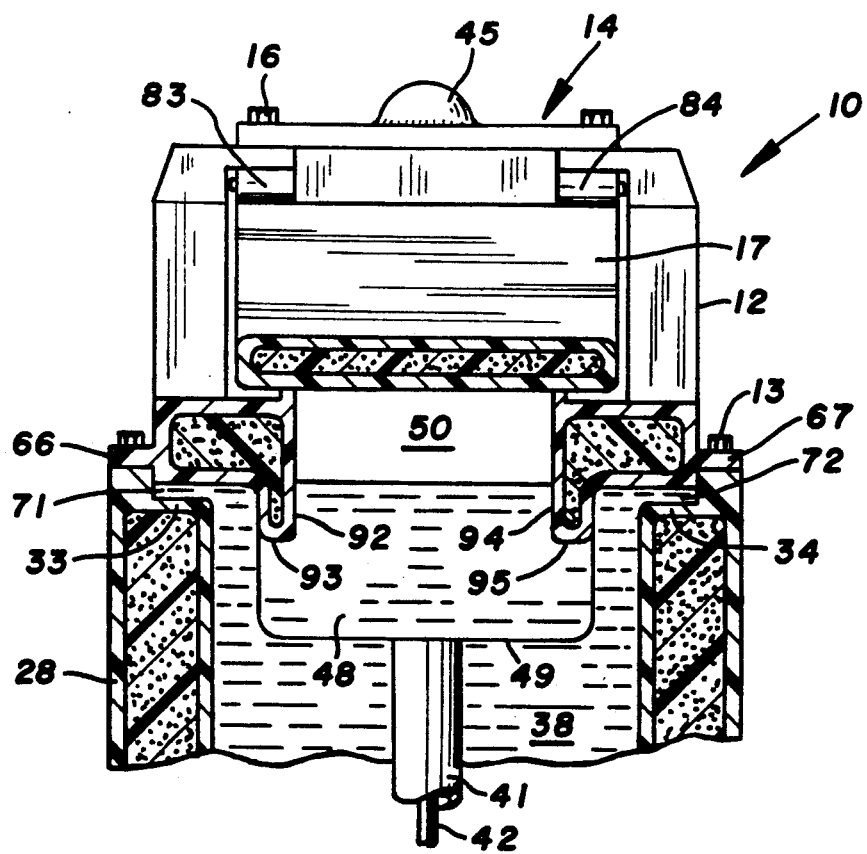
FIG. 9 is an enlarged sectional view taken along line 9—9 of FIG. 4.

As shown in FIG. 9, top unit 92 has side baffles 92 and 94 located along opposite sides of drinking well 50. Baffles have lower edges 93 and 95 that extend into the water to prevent air from flowing from drinking well 50 into tank chamber 38. Top unit 12 has a second pair of baffles 97 on opposite sides of drinking well 52. Baffles 97 have lower edges 98 extended below the level of water in drinking well 52, as shown in FIG. 4. Baffles 92 and 94 extend between and are joined to transverse portions of baffle 48 and end walls 73 and 74. The transverse portions of baffle 48 provide back walls for pockets 50 and 52.

As seen in FIG. 4, door 18 has a generally flat top member 76 of plastic material and an inwardly spaced bottom member 77 that extends into the top of drinking well 52. The interior of door 18 is filled with a core 78 of plastic material to insulate the door. The upper end of door 18 has a pair of bosses 79 and 81 that accommodates pin or rod 21. Bosses 79 and 81, as seen in FIGS. 1, 2 and 7, are located between a generally rectangular abutment 82 on the upper portion of top unit 12. Door 17 has a pair of bosses 83 and 84 that are located between an abutment 86. Rod 19 extends through bosses 83 and 84 and abutement 86 to pivotally mount door 17 on top unit 12.

The opening 51 in top unit 12 is closed with a cap or top member 14. Cap 14 comprises a generally flat top wall 87 and a generally rectangular downwardly directed baffle 88 that telescopes into the space surrounded by baffle 48 on top unit 12. Baffle 88 has a continuous generally rectangular lower edge 87 that is normally located below the level 47 of the water in chamber 38. This confines valve 43 and float 44 in an enclosed space 91 below top wall 87 of cap 14. Cap 14 has inner and outer walls of plastic and an internal core of foam plastic material to insulate both the top as well as baffle 88 of cap 14. Fasteners 16 secures cap 14 to the upper portion of top unit 12. Fasteners 16 can be removed to allow cap 14 to be separated from the top unit 12 thereby providing access for repair and services to the valve assembly 43 and float 44.

Top unit 12 and cap 14 can be rotationally molded plastic members that are filled with heat insulating foam plastic. Other types of materials can be used for the wall and insulating structures as the top unit 12 and cap 14.

In use the animal will raise a door 17 or 18 to provide access to one of drinking wells 50 and 52. As the animal drinks water the level of the water drops in chamber 38. This lowers the float 44 which turns valve assembly 43 on. Fresh water supplies via pipe 42 is then dispensed into tank chamber 38 to refill chamber 38 with water. As the level of the water raises the air in chamber 91 is vented through vent tube 96. The water within baffle 48 flows under the lower edge 49 of the baffle as indicated by the arrows 90, into drinking wells of 50 and 52. The water also circulates around baffle 48 since the sides of the baffle 48, as shown in FIG. 5, are spaced from the inside of side walls 27 and 28. The circulation of the water within chamber 38 of insulated tank 11 prevents water in chamber 38 from freezing in adverse cold weather conditions. When the animal concludes drinking of the water it moves away from drinker 10. Doors 17 and 18 will automatically return to their closed positions thereby closing the top opening above drinking wells 50 and 52 to protect the water therein from adverse weather conditions as well as contamination of the water with a foreign particluar matter including dust, dirt and other debris.

Figure 10:
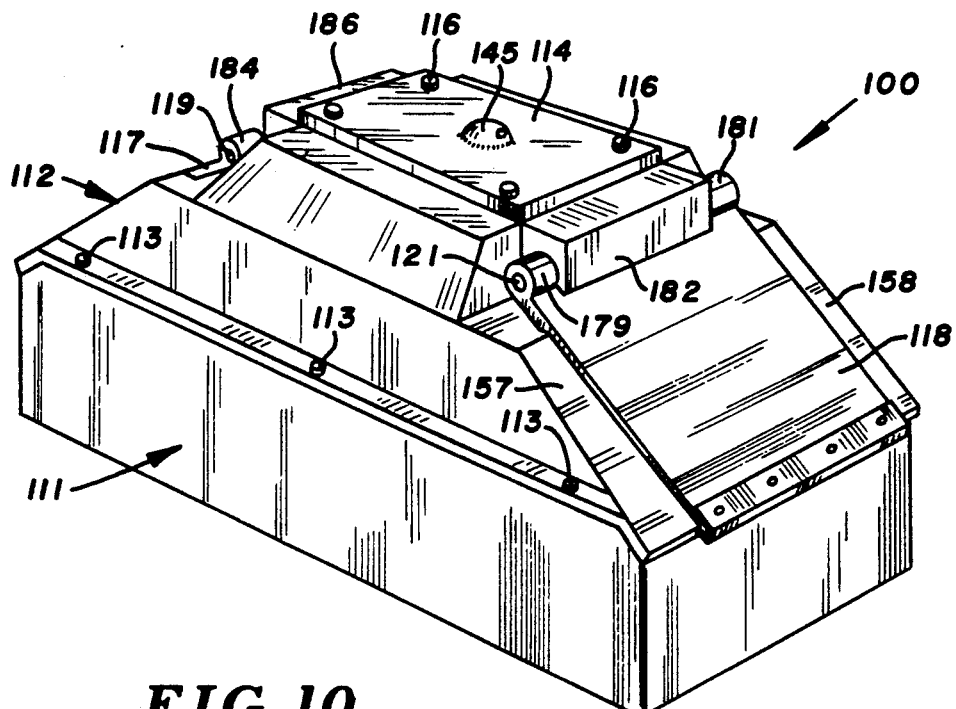
FIG. 10 is a perspective view of a modification of the animal drinker of the invention.
Figure 11:
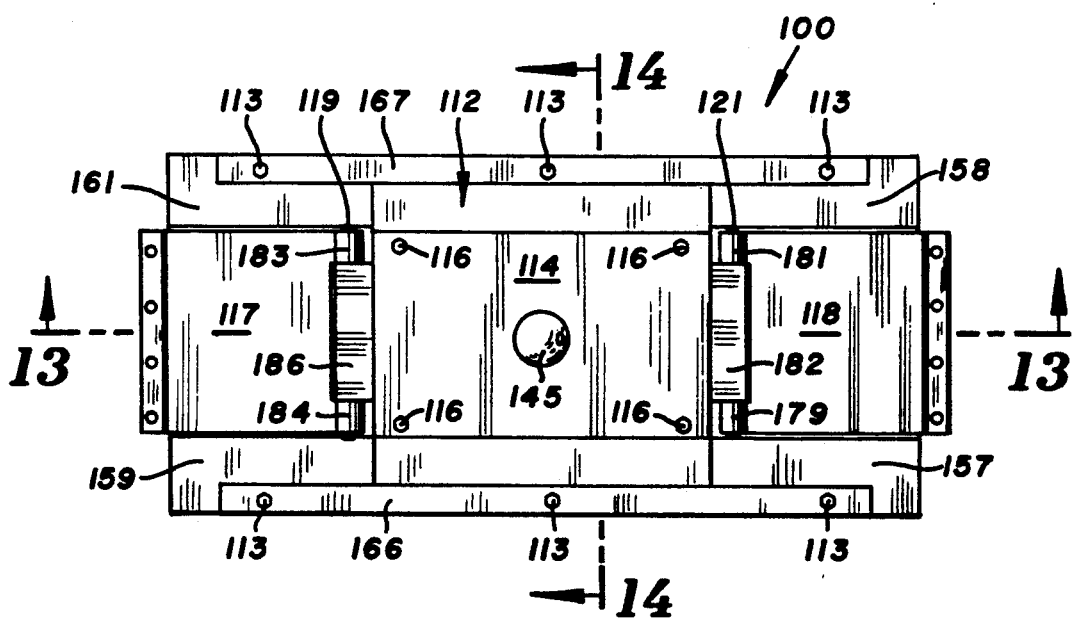
FIG. 11 is a top plan view of FIG. 10.
Figure 12:
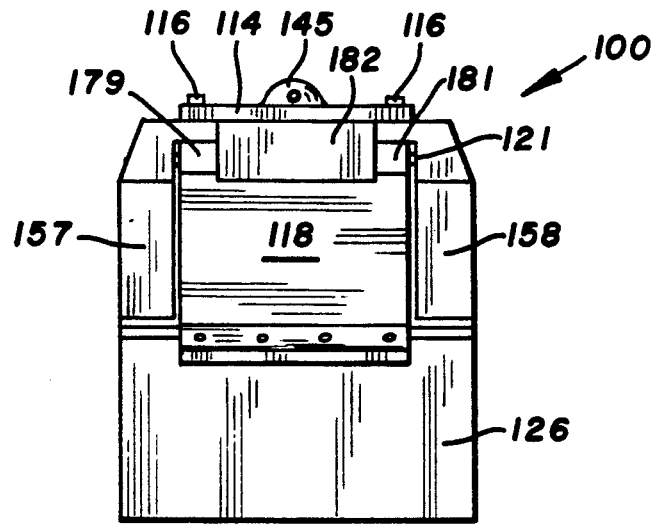
FIG. 12 is an end elevational view of the right end of FIG. 10.
Figure 13:
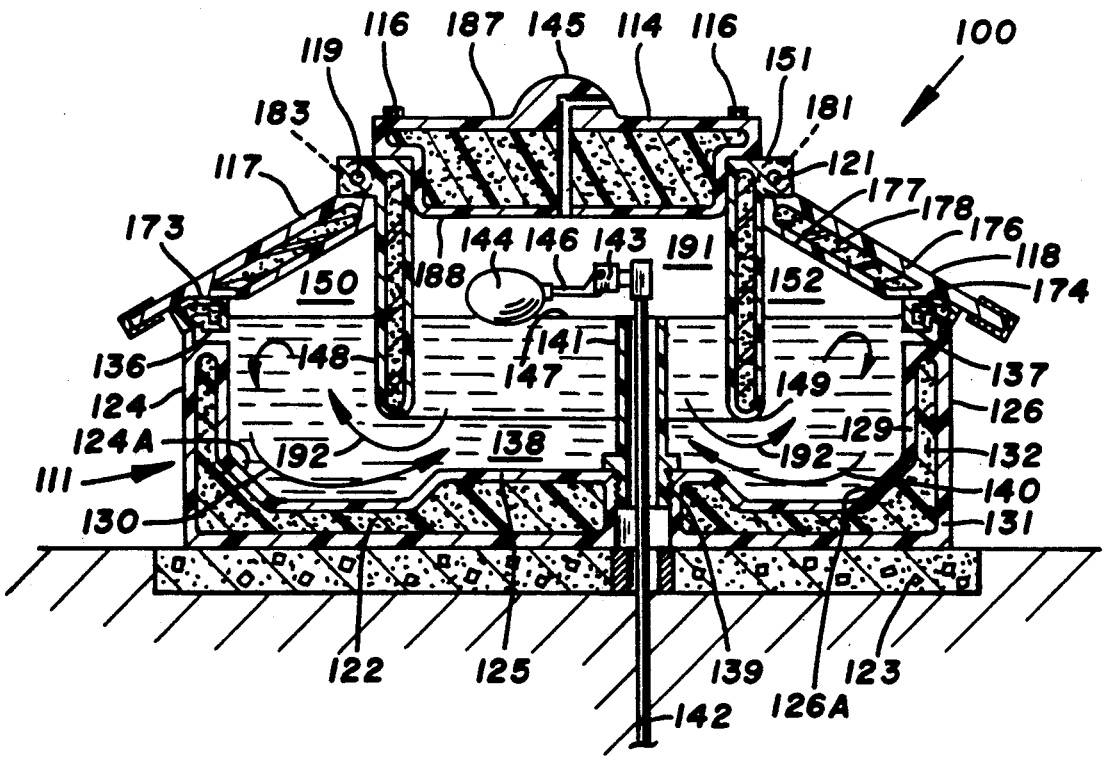
FIG. 13 is a sectional view taken along line 13—13 of FIG. 11.
Figure 14:
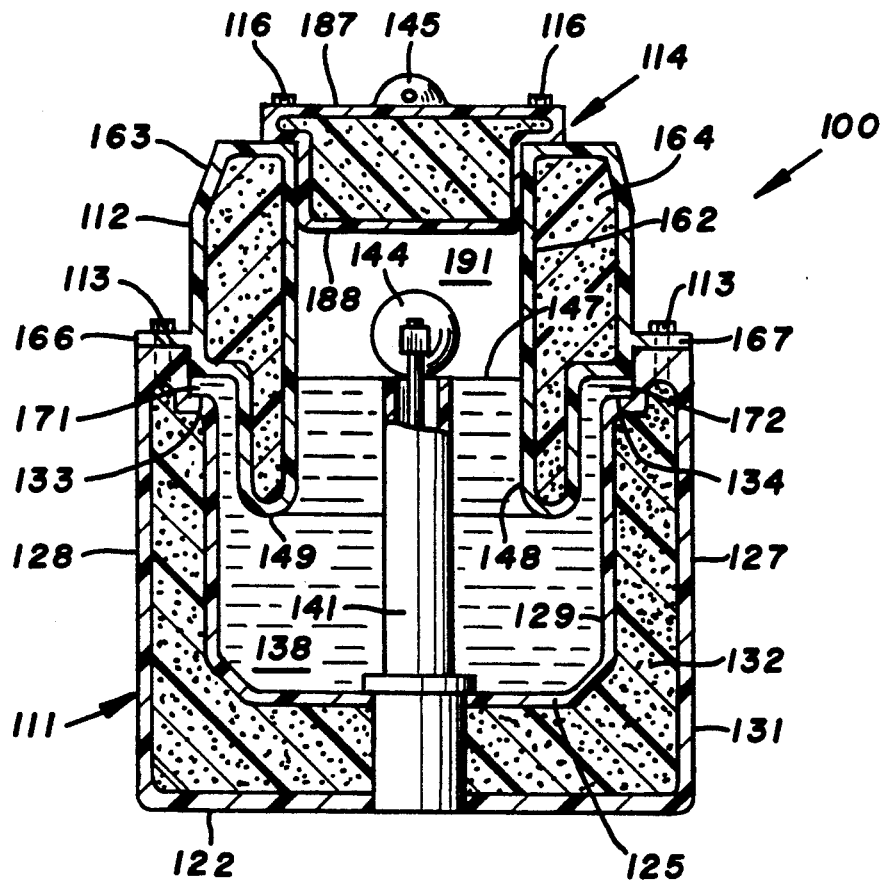
FIG. 14 is an enlarged sectional view taken along the line 14—14 of FIG. 11.

Refering to FIG. 10 to 12 there is shown a modification of the animal drinker of the invention indicated generally at 100 for providing animals such as beef cattle, hogs, sheep, horses, and the like with fresh drinking water under cold climatic conditions without the use of heaters or external heating sources for preventing the freezing of the water in the drinker. Drinker 100 has the same general structure as drinker 10 including the structures shown in FIG. 8 an 9. Corresponding parts of drinker 100 have the same reference numberals as drinker 10 with a prefix 1. Drinker 100 has a generally rectangular open top tank 111 supporting a top unit 112. Fasteners 113, such as bolts, screws, and the like, secure top unit 112 to tank 111. A cap 114 mounted on top unit 112 is held in place with fasteners 116. Top unit 112 pivotally supports a pair of doors 117 and 118 which close the top of drinking openings or wells 150 and 152, as seen in FIG. 13 to reprevent the outside cold air from freezing water in the drinking wells and preventing outside foreign materials from contaminating the water in the drinker. Transverse rods 119 and 121 pivotally support doors 117 and 118 on opposite sides of top unit 112 for movement about generally horizontal axes which allow doors 117 and 188 to be moved upwardly by an animal to provide access to the water in drinking wells 150 and 152.

Figure 15:
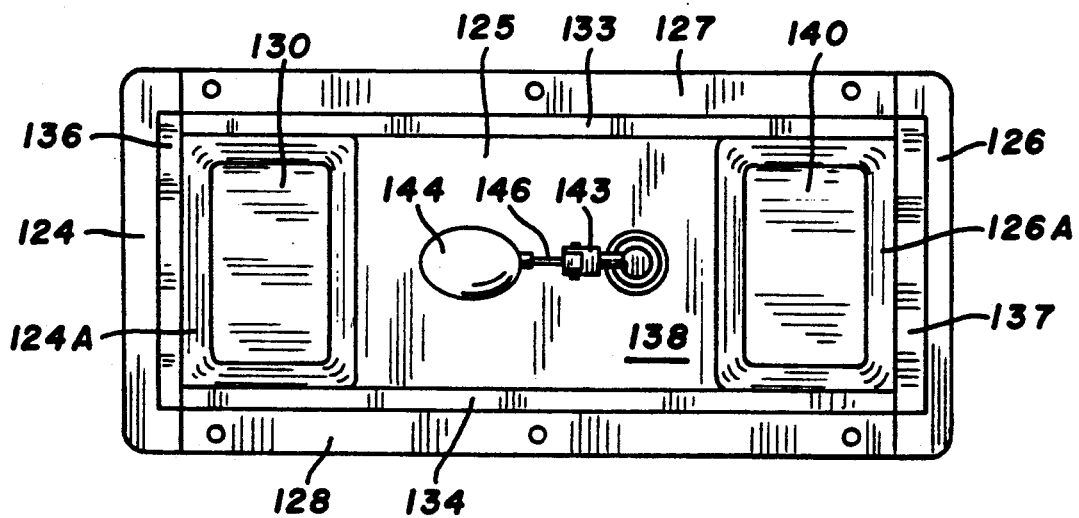
FIG. 15 is a top plan view of the tank of the drinker of FIG. 10.

As shown in FIGS. 11 and 12, tank 111 has a generally flat bottom wall 122 supported on a concrete slab 123 or other suitable supporting surface on the ground. Bottom wall 122 has a central shelf 125 extended between downwardly directed pockets 130 and 140. Pockets 130 and 140 are at the bottom of drinking wells 150 and 152 and accumulate cold water in the drinking wells as they are the lowest portions on the drinking wells. As seen in FIGS. 13 and 15 the side walls and end walls of the tank have tapered lower sections 124A and 126A that surround pockets 130 and 140. Sections 124A and 126A taper downwardly and inwardly and provide inclined surfaces for directing the circulation of the water into and out of the pockets 130 and 140 as shown by the water circulation arrows 19 in FIG. 13. The cold water from the top of the drinking wells flows downwardly into pockets 130 and 140. When warmer water is discharged into the chamber 191 surrounded by baffle 148 the warmer water flows under baffle 148 into the upper portions of drinking wells 150 and 152. The cold water in pockets 130 and 140 is forced out of the pockets into the center portion of tank chamber 138 where it mixes with the warmer water. The circulation of the water in the tank 138 increases the average temperature of the water in drinking wells 150 and 152 thereby reducing freezing of the water in extreme cold weather environments.

Tank 111 has upright end walls 124 and 126 joined to the opposite ends of bottom wall 122 and upright side walls 127 and 128 to form the tank chamber 138 which stores the water. Tank 111 is a one piece plastic structure having an inner plastic shell 129, an outer plastic shell 131 and a core 132 of thermal insulating materials such as foam plastic or the like. Tank 111 is made by a rotational molding process that forms a tank in a one piece structure. Top unit 112 is also made by a rotational molding process. Other methods can be used to make tank 111 and top 112.

As seen in FIG. 12, the inside upper edges of side walls 127 and 128 have longitudinal shoulders 133 and 134 extended between transverse shoulders 136 and 137 in end walls 124 and 126 respectively. Shelf 125 has a threaded hole 129 accommodating an upright pipe 141 open to a hole in concrete slab 123 and open at the top end thereof to the upper portion of chamber 138 which is isolated from the external environment to prevent the freezing of the valve assembly 143 and the water surrounding the valve assembly. A water supply pipe 142 connected to an underground water main or pipe extends through draing pipe 141. An on-off float valve assembly 143 is connected to the upper end of pipe 142. Valve assembly 143 operates in response to level 147 of the water in chamber 138 with a float 144 connected with an arm 146 to valve 143. When the level of water in chamber 148 moves down, float 144 also moves down thereby opening valve 143 to discharge water into chamber 138. Float valve assembly 143 can be any of the conventional float valves used in tanks to control the level of water in the tank. Examples of float valves are shown by Barker et al in U.S. Pat. No. 3,835,882 and Schafer et al in U.S. Pat. No. 4,395,974.

Top unit 112 has a generally rectangular downwardly directed baffle 148 surrounding float valve assembly 143 and float 144 as well as the upper end of drain pipe 141. Baffle 148 is a continuous structure that surrounds a chamber 191 that accommodates the float valve assembly 143. Baffle 148 has a continuous lower edge 149 that projects down into the water in the tank chamber 138 to prevent cold air from the drinking wells from freezing the water within the space accommodating float valve assembly 143.

Top unit 112 has a top opening 151, as shown in FIG. 11, providing access to float valve assembly 143 as well as drain pipe 141. Opening 151 is closed with a cap 114 attached to the top wall with the fasteners 116. Cap 114 has an upwardly extended projection 145 accommodating a vent passage 196 which allows air to be vented from chamber 191 to atmosphere during filling of chamber 138 with water. Fasteners 116 can be removed to allow cap 114 to be removed from top wall 112 thereby providing access to float valve assembly 143 for servicing and repair. Baffle 48 also has transverse end portions that provide the back walls for drinking wells 150 and 152 as shown in FIG. 11. As seen in FIG. 11, baffle 148 projects downwardly into the water in tank 138 toward the shelf 125. The transverse portions of the baffle 148 are located outwardly of the opposite ends of shelf 125 to allow the cool water in the pockets 130 and 140 to flow into the center portion of the water chamber 138.

Refering to FIG. 9, door 118 is located between downwardly projected side shoulders 157 and 158 which protect opposite sides of the door 117 when it is in the closed position. Door 118 projects outwardly from the end of top unit 112 providing a ledge or lip that is engaged by the animal to open the door 118. Top unit 112 also has side shoulders 161 and 162 located on opposite sides of the door 117 when this door is in the closed position.

As shown in FIG. 12 top unit 112 has an inner shell or wall 162 and an outer shell or wall 163 located on opposite sides of a thermal plastic material or core, such as urethane and the like. The opposite sides of top unit 112 have outwardly directed longitudinal flanges 166 and 167 that rest on longitudinal ledges 168 and 169 of side walls 127 and 128. Flanges 166 and 167 are in surface engagement with top ledges 168 and 169 and are retained thereon with fasteners 113. Longitudinal spaces 171 and 172 between shoulders 133 and 134 accommodate water in tank 138 to prevent air from entering the top of chamber 138. Baffle 148 is located in spaced relation relative to the inside of walls 128 and 129 so that water can circulate around baffle 148 in spaces 171 and 172. The water in spaces 171 and 172 function as a seal to minimize the flow of cold air into chamber 138. In extreme cold weather conditions the water in spaces 171 and 172 may freeze thereby further blocking the flow of cold air into chamber 138. As seen in FIG. 11 the top unit has transversely downwardly directed members 173 and 174 that rest on transverse ribs 135 when top unit 112 is attached to tank 111.

Door 118 has a generally flat top member 176 of plastic material and inwardly spaced bottom member 177 that projects a short distance into top of drinking well 152. The interior of door 118 is filled with a core 178 of plastic insulating material. The upper end of door 118 has a pair of bosses 179 and 181 that accommodate a pin or rod 121. Bosses 178 and 181 are located between a generally rectangular abutment 182 on the upper portion of top unit 112. Door 117 has a pair of bosses 183 and 184 that are located between an abutment 186. Rod 119 extends through bosses 183 and 184 and abutment 186 to pivotally mount door 117 on top unit 112.

Opening 151 in top unit 112 is closed with as cap or top member 114. Cap 114 has a generally flat top wall 87 and a generally rectangular downwardly directed plug 188 that telescope into the top of the space surrounded by baffle 148 on top unit 112. Plug 188 has a continuous outer wall located in close surface relationship to the inside wall of baffle 148 to preclude the flow of outside air into chamber 191 accommodating float valve assembly 143 thereby minimizing the freezing of the float valve assembly and adjacent water. Fasteners 116 secure cap 114 to upper portion of top unit 112 to allow cap 114 to be removed from the top unit 112 to provide access for repair and servicing of valve assembly 143 and float 144.

In use the animal will raise door 117 or 118 to provide access to one of drinking wells 150 and 152. As the animal drinks the water in the drinking well the level of the water in the tank drops. This lowers float 144 which in turn opens valve assembly 143. Fresh water supply is then dispensed into tank chamber 138 to refill the chamber with water. This water is at ground temperature substantially above the freezing temperature of water. The water surrounded by the baffle 148 flows under the lower edge 149 of the baffle as indicated by arrows 19 into drinking wells 150 and 152. The water also circulates around baffle 148 since the sides of the baffle are spaced from the inside surfaces of the side walls 127 and 128. The colder water in drinking wells 150 and 152 flows downwardly into the pockets 130 and 140. The cold water in pockets 130 and 140 is then forced upwardly into the center portions of tank chamber 138 where it warms up due to the warmer water being discharged into the tank. The inwardly tapered walls 124A and 126A of the lower portions of the side and end walls of the tank facilitate the continuous circulation of the water into and out of pockets 130 and 140 which aids in the prevention of the freezing of the water in the drinking wells.

When the animal concludes the drinking of the water it moves away from the drinker. Doors 117 or 118 will automatically return to their closed positions thereby closing the top of the drinking wells 150 and 152 to further protect the water therein from adverse weather conditions as well as the contamination of the water with foreign matter including dust, dirt, and other debris.

While there has been shown and described perferred embodiments of the animal drinker of the invention it is understood that changes in the structure, materials, and arrangement of structure may be made by those skilled in the art without departing from the invention. The invention is defined in the following claims.

I claim:

1. An animal drinker comprising: tank means having generally upright wall means and a bottom wall surrounding a chamber for accommodating water, said wall means having upright side walls and end walls, top means mounted on the upright wall means covering said chamber, said top means having drinking openings providing drinking wells and downwardly directed first baffle means extended into the chamber and spaced inwardly from the upright side and end walls and above the bottom wall whereby water is located between the baffle means and upright side and end walls, said baffle means having a bottom edge located below the normal level of the water in the chamber, said baffle means surrounding a space within the chamber and providing back walls, for the drinking openings, means securing the top means to the wall means, said top means having an opening open to the space surrounded by the first baffle means, cap means mounted on the top means closing said opening, said cap means having second baffle means extended downwardly into the water in the chamber surrounding an enclosed second space, said second baffle means having a lower edge located below the normal level of the water in the chamber, means for supplying water to the chamber located within the second space, said water flowing under the first and second baffle means into said drinking wells, door means for closing the drinking openings, and means pivotally connecting the door means to the top means whereby the door means normally close the drinking openings and an animal can lift the door means to provide access to the water in the drinking wells.

2. The drinker of claim 1 wherein: the first baffle means includes a portion thereof having a generally rectangular shape and a continuous bottom edge located below the normal level of the water in the chamber.

3. The drinker of claim 1 wherein: the second baffle means has a generally rectangular shape and a continuous lower edge located below the normal level of the water in the chamber.

4. The drinker of claim 1 wherein: the first baffle means has a generally rectangular shape and a continuous bottom edge located below the normal level of the water in the chamber, the second baffle means has a generally rectangular shape adapted to telescope into the space surrounded by the first baffle means, said second baffle means having a continuous lower edge located below the normal level of the water in the chamber.

5. The drinker of claim 4 wherein: the second baffle means is spaced inwardly of the first baffle means.

6. The drinker of claim 1 wherein: the side walls have longitudinal shoulders spaced below said top means for accommodating water.

7. The drinker of claim 1 wherein: said tank means has a first inner plastic shell, a first outer plastic shell, and space between said shells, foam plastic insulation means in said space, said top means including the first baffle means having second inner plastic shell, a second outer plastic shell, and space between said second shells, and foam plastic insulation means in the space between said second shells.

8. The drinker of claim 7 wherein: the cap means including the second baffle means has a plastic inner shell, a plastic outer shell spaced from the inner shell, and foam plastic insulation means in said space between the inner and outer shells of the cap means.

9. The drinker of claim 1 wherein: the cap means includes an air vent passage open to the space surrounded by the first baffle means and externally of the cap means to allow air to flow from the space to the outside environment.

10. The drinker of claim 1 wherein: the first baffle means includes side walls joined to the back walls providing opposite sides for the drinking openings, said side walls of the first baffle means having bottom edges located below the normal level of the water in the chamber of the tank means.

11. The drinker of claim 10 wherein: the side walls of the first baffle means are spaced inwardly from the side walls of the tank means.

12. An animal drinker comprising: tank means having generally upright wall means and a bottom wall surrounding a chamber for accommodating water, said wall means having at least one wall and side wall, top means mounted on the wall means covering said chamber, said top wall means having at least one drinking opening providing an animal drinking well and downwardly directed first baffle means extended into the chamber and spaced inwardly from the wall means and above the bottom wall whereby water is located between the first baffle means and wall means, said first baffle means surrounding space within the chamber and having an upright wall spaced from the end wall providing a back wall of the drinking well and a bottom edge located below the normal level of the water in the chamber, means securing the top means to the wall means, said top wall means having an opening open to the space surrounded by the first baffle means, cap means mounted on the top means closing said opening, said cap means having second baffle means extended downwardly into the water in the chamber surrounding an enclosed second space within the chamber, said second baffle means having a lower edge located below the normal level of the water in the chamber, means for supplying water to the chamber located in the second space, said water flowing under the first and second baffle means into said drinking well, door means for closing the drinking opening, and means movably connecting the door means to the top means whereby the door means normally closes the drinking opening and an animal can lift the door means to provide access to the water in the drinking well.

13. The drinker of claim 12 wherein: the first baffle means has a generally rectangular shape and a continuous bottom edge located below the normal level of the water in the chamber.

14. The drinker of claim 12 wherein; the second baffle means has a generally rectangular shape and a continuous lower edge located below the normal level of the water in the chamber.

15. The drinker of claim 12 wherein: the first baffle means has a generally rectangular shape and a continuous bottom edge located below the normal level of the water in the chamber, the second baffle means has a generally rectangular shape adapted to telescope into the space surrounded by the first baffle means, said second baffle means having a continuous lower edge located below the normal level of the water in the chamber.

16. The drinker of claim 15 wherein: the second baffle means is spaced inwardly of the first baffle means.

17. The drinker of claim 12 wherein: the side walls have longitudinal shoulders spaced below said top means for accommodating water.

18. The drinker of claim 12 wherein: said tank means has a first inner plastic shell, a first outer plastic shell, and space between said shells, foam plastic insulation means in said space, said top wall means including the first baffle means having second inner plastic shell, a second outer plastic shell, and space between said second shells.

19. The drinker of claim 18 wherein: the cap means including the second baffle means has a plastic inner shell, a plastic outer shell spaced from the inner shell, and foam plastic insulation means in said space between the inner and outer shells of the cap means.

20. The drinker of claim 12 wherein: the cap means includes an air vent passage open to the space surrounded by the first baffle means and externally of the cap means to allow air to flow from the space to the outside environment.

21. The drinker of claim 12 wherein: the first baffle means includes side walls joined to the upright wall providing opposite sides of the drinking opening, said side walls of the baffle means having bottom edges located below the normal level of the water in the chamber of the tank means.

22. The drinker of claim 21 wherein: the side walls of the first baffle means are spaced inwardly from the side walls of the tank means.

23. An animal drinker comprising: tank means having generally upright wall means and a bottom wall surrounding a chamber for accommodating water, said wall means having upright side walls and end walls, top means mounted on the upright wall means covering said chamber, said top means having drinking openings providing drinking wells and downwardly directed baffle means extended into the chamber and spaced inwardly from the upright side and end walls and above the bottom wall whereby water is located between the baffle means and upright side and end walls, said baffle means having a bottom edge located below the normal level of the water in the chamber, said baffle means surrounding a space within the chamber and providing back walls for the drinking openings, means securing the top means to the wall means, said top means having an opening open to the space surrounded by the baffle means, cap means mounted on the top means closing said opening, means for supplying water to the chamber located within the space surrounded by the baffle means, said water flowing under the baffle means into said drinking wells, door means for closing the drinking openings, and means pivotally connecting the door means to the top means whereby the door means normally close the drinking openings and an animal can lift the door means to provide access to the water in the drinking wells.

24. The drinker of claim 23 wherein: the baffle means includes a portion thereof having a generally rectangular shape and a continuous bottom edge located below the normal level of the water in the chamber.

25. The drinker of claim 23 wherein: the side walls of the tank means have longitudinal shoulders spaced below said top means for accommodating water.

26. The drinker of claim 23 wherein: said tank means has a first inner plastic shell, a first outer plastic shell, and space between said shells, foam plastic insulation means in said space, said top means including the first baffle means having second inner plastic shell, a second outer plastic shell, and space between said second shells, and foam plastic insulation means in the space between said second shells.

27. The drinker of claim 23 wherein: the cap means has a plastic inner shell, a plastic outer shell spaced from the inner shell, and foam plastic insulation means in said space between the inner and outer shells of the cap means, and air vent means open to the space surrounded by the baffle means to allow air to flow from said space to atmosphere.

28. The drinker of claim 23 wherein: the cap means includes an air vent passage open to the space surrounded by the baffle means and externally of the cap means to allow air to flow from the space to the outside environment.

29. The drinker of claim 23 wherein: the baffle means includes side walls joined to the back walls providing opposite sides for the drinking openings, said side walls of the first baffle means having bottom edges located below the normal level of the water in the chamber of the tank means.

30. The drinker of claim 29 wherein: the side walls of the baffle means are spaced inwardly from the side walls of the tank means.

31. An animal drinker comprising: tank means having generally upright wall means and a bottom wall surrounding a chamber for accommodating water, said wall means having upright side walls and end walls, top means mounted on the upright wall means covering said chamber, said top means having at least one drinking opening providing a drinking well and downwardly directed baffle means extended into the chamber and spaced inwardly from the upright side and end walls and above the bottom wall whereby water is located between the baffle means and upright side and end walls, said baffle means having a bottom edge located below the normal level of the water in the chamber, said baffle means surrounding a space within the chamber and providing a back wall, for the drinking opening, means securing the top means to the wall means, said top means having an opening open to the space surrounded by the baffle means, cap means mounted on the top means closing said opening, means for supplying water to the chamber located within the space surrounded by the baffle means, said water flowing under the baffle means into said drinking well, door means for closing the drinking opening, and means pivotally connecting the door means to the top means whereby the door means normally close the drinking opening, and an animal can lift the door means to provide access to the water in the drinking well.

32. The drinker of claim 31 wherein: the baffle means includes a portion thereof having a generally rectangular shape and a continuous bottom edge located below the normal level of the water in the chamber.

33. The drinker of claim 31 wherein: the side walls of the tank means have longitudinal shoulders spaced below said top means for accommodating water.

34. The drinker of claim 31 wherein: said tank means has a first inner plastic shell, a first outer plastic shell, and space between said shells, foam plastic insulation means in said space, said top means including the first baffle means having second inner plastic shell, a second outer plastic shell, and space between said second shells, and foam plastic insulation means in the space between said second shells.

35. The drinker of claim 31 wherein: the cap means has a plastic inner shell, a plastic outer shell spaced from the inner shell, and foam plastic insulation means in said space between the inner and outer shells of the cap means, and air vent means open to the space surrounded by the baffle means to allow air to flow from said space to atmosphere.

36. The drinker of claim 31 wherein: the cap means includes an air vent passage open to the space surrounded by the baffle means and externally of the cap means to allow air to flow from the space to the outside environment.

37. The drinker of claim 31 wherein: the baffle means includes side walls joined to the back walls providing opposite sides for the drinking opening, said side walls of the baffle means having bottom edges located below the normal level of the water in the chamber of the tank means.

38. The drinker of claim 37 wherein: the side walls of the baffle means are spaced inwardly from the side walls of the tank means.

* * * * *